Nov. 27, 1928.

L. W. VAN BUSKIRK 1,693,416

ROCKER BEARING

Filed March 26, 1926

Inventor:
L. W. Van Buskirk
By Monroe E. Miller
Attorney.

Patented Nov. 27, 1928.

1,693,416

UNITED STATES PATENT OFFICE.

LESHER W. VAN BUSKIRK, OF CLINTON, NEW JERSEY.

ROCKER BEARING.

Application filed March 26, 1926. Serial No. 97,625.

The present invention relates to rocker bearings, such as used for the toggles of rock crushers, and the primary object of the invention is the provision of a toggle or rocker member of novel and improved construction.

In crushers, such as employed for crushing stone, coal, and the like, it is the practice to use toggle plates or members fitting into and located between bearings having seats for the toggle members, one bearing being carried by the movable jaw frame of the crusher and the other bearing being carried by the power element, so that the straightening-out action of the toggle produces great strength during the crushing action. The toggle plates or arms of crushers in use are fairly large in size and are subjected to rapid wear at their bearing surfaces. These toggle plates are also of varying sizes to be used interchangeably in adapting the crusher for various sizes of stones to be crushed. In order to increase the life of these toggle plates they have been made from shock and wear resisting metals, making the plates rather expensive. When the bearing surfaces of the toggle plates become slightly worn they must be discarded due to the overheating of the bearings and the fact that the worn down toggle plates will not crush the stone to the desired size. The bearing surfaces of the toggle plates also wear unevenly due to the fact that the toggle plates operate in oblique positions between the jaw and power member or other parts between which the plates are disposed.

The present invention aims to reduce the losses incident to the wearing away and necessary discarding of one-piece toggle plates or members now in use, by the provision of a toggle plate having a removable and replaceable portion at each bearing surface, so that such portions which receive the wear may be removed when worn out and replaced by new ones.

Another object of the invention is the provision of a toggle plate or other rocker member having a replaceable wear piece or portion which may be reversed when worn at one side or point, so that it may receive wear at the opposite side or point, to increase the life thereof.

A further object is the provision of a toggle plate or rocker member having a rocker bearing wear piece, or two opposite pieces, assembled therewith in a novel and efficient manner.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
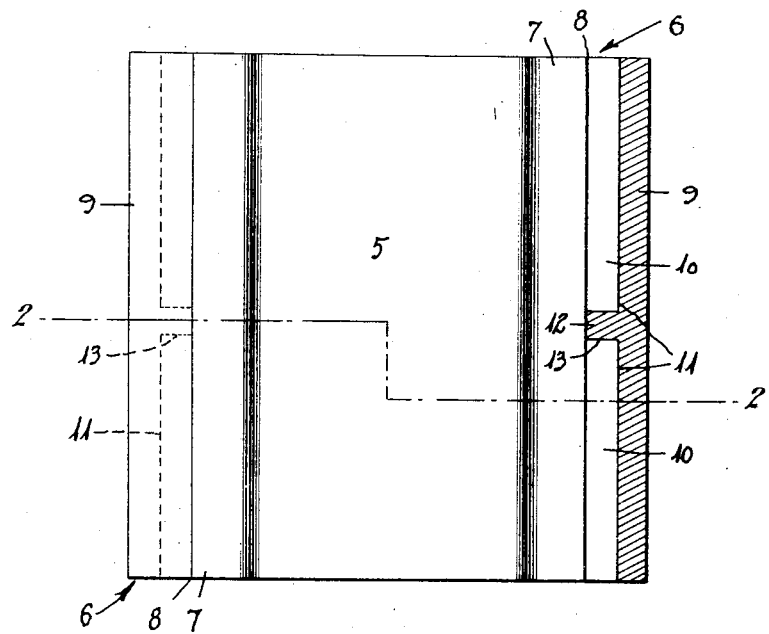
Figure 1 is a plan view of a toggle plate embodying the improvements, one wear piece being shown in section.
Figure 2:
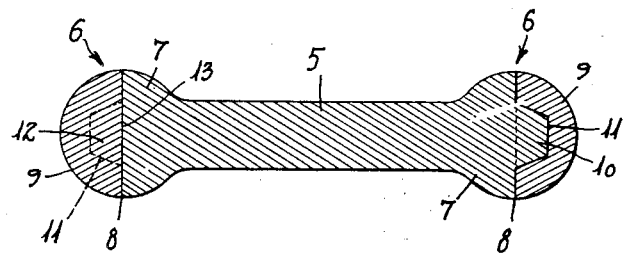
Fig. 2 is a section on the line 2—2 of Fig. 1.

The toggle plate or member 5 illustrated has at opposite edges the cylindrical bearing portions 6 which are divided, as at 8, in planes at right angles with the plane of the plate 5, and parallel with the portions 6. The inner halves or parts 7 of the portions 6 are integral with the plate 5, while the outer parts or sections 9 are separate pieces. The plate 5 and portions 7 thereof may be of inexpensive metal or composition, while the removable bearing pieces 9 are of suitable shock and wear resisting metal or material. The outer convexed surfaces of the wear pieces 9 are adapted to seat in the usual toggle bearings for rocking motion therein, and are therefore position at the wearing surfaces of the toggle member or arm to receive the wear.

The pieces 9 are removable and replaceable, the inner flat surfaces thereof abutting the outer flat surfaces of the portions or abutments 7 of the plate 5. The portions 7 are provided with outstanding longitudinal ribs or tongues 10 of approximately one-half the width of the piece 9, and having bevelled sides, and the wear pieces 9 have similarly shaped grooves 11 at their inner sides to snugly receive the tongues 10, thereby providing tongue and groove joints between the plate 5 and wear pieces 9, to prevent transverse displacement of the plate and wear pieces relatively to one another. Also, by having the grooves 11 in the wear pieces 9, less material is necessary for such pieces.

Each wear piece 9 is provided between its ends with a web 12 extending transversely across the groove 11, and a transverse slot or notch 13 is cut through the corresponding tongue or rib 10, to receive the web 12, thereby preventing relative longitudinal displacement between the wear piece 9 and edge portion of the plate 5. Thus, with the wear pieces 9 seated in the bearings, said wear pieces are held securely in engagement with the plate 5, to prevent accidental separation of the parts, although the wear pieces may be readily slipped off the plate when the plate is removed from the bearings.

When the wear pieces 9 have been worn away so that they are no longer of use, they may be readily removed and replaced by new ones, and the plate 5 may be used as long as it lasts, and the life thereof is very long, so that only the wear pieces require replacement. It is also possible to reverse the wear pieces end for end and to interchange the two wear pieces of a toggle plate, so as to double the life of each wear piece. It is also possible to use the same wear pieces for toggle plates 5 of different sizes, so that two wear pieces 9 may be used on plates 5 of different sizes for various sizes of rock.

It is also possible to use the wear piece 9 at one edge only of a toggle plate or rocker member when an opposite wear piece is not used or required.

Having thus described the invention, what is claimed as new is:—

1. A device of the character described comprising a toggle member having abutments at opposite ends, and removable semi-cylindrical wear pieces seated against said abutments with their semi-cylindrical surfaces exposed to seat in bearings for rocking motion therein.

2. A device of the character described comprising a toggle member having abutments at opposite ends, and removable semi-cylindrical wear pieces seated against said abutments with their semi-cylindrical surfaces exposed to seat in bearings for rocking motion therein, said abutments and wear pieces having portions fitted together to prevent longitudinal and transverse displacement of said pieces relatively to said member.

3. A device of the character described comprising a toggle member having abutments at opposite ends, and removable semi-cylindrical wear pieces seated against said abutments with their semi-cylindrical surfaces exposed to seat in bearings for rocking motion therein, said abutment and pieces having tongue and groove joints.

4. A device of the character described comprising a toggle member having abutments at opposite ends, and removable semi-cylindrical wear pieces seated against said abutments with their semi-cylindrical surfaces exposed to seat in bearings for rocking motion therein, said abutments having outstanding tongues, and said pieces having grooves receiving said tongues.

5. A device of the character described comprising a toggle member having abutments at opposite ends, and removable semi-cylindrical wear pieces seated against said abutments with their semicylindrical surfaces exposed to seat in bearings for rocking motion therein, said abutments having outstanding tongues with transverse slots therein, and the wear pieces having grooves to receive said tongues and transverse webs to engage in said slots.

6. A device of the character described comprising a toggle plate having opposite abutments, and interchangeable and reversible semi-cylindrical wear pieces seated against said abutments.

7. A device of the character described comprising a toggle plate having opposite abutments, and interchangeable and reversible semi-cylindrical wear pieces seated against said abutments, said abutments and pieces having tongues and grooves to fit together in the interchanged and reversed positions of said wear pieces.

In testimony whereof I hereunto affix my signature.

LESHER W. VAN BUSKIRK.